(12) United States Patent
Åkerblom et al.

(10) Patent No.: US 7,830,136 B2
(45) Date of Patent: Nov. 9, 2010

(54) METHOD AND ARRANGEMENT FOR MOUNTING A SENSOR DESIGNED FOR MEASURING THE DISTANCE BETWEEN STATOR AND ROTOR

(75) Inventors: Bengt Åkerblom, Vårby (SE); Jonas Ollmar, Bandhagen (SE)

(73) Assignee: Daprox AB (SE)

( * ) Notice: Subject to any disclaimer, the term of this patent is extended or adjusted under 35 U.S.C. 154(b) by 230 days.

(21) Appl. No.: 11/921,630

(22) PCT Filed: May 22, 2006

(86) PCT No.: PCT/SE2006/050145

§ 371 (c)(1),
(2), (4) Date: Dec. 5, 2007

(87) PCT Pub. No.: WO2006/135331

PCT Pub. Date: Dec. 21, 2006

(65) Prior Publication Data

US 2009/0128137 A1 May 21, 2009

(30) Foreign Application Priority Data

Jun. 14, 2005 (SE) .................................. 0501346

(51) Int. Cl.
*G01R 33/02* (2006.01)
(52) U.S. Cl. .................................. 324/207.13; 73/660
(58) Field of Classification Search ............ 324/207.13; 73/660
See application file for complete search history.

(56) References Cited

U.S. PATENT DOCUMENTS 5,293,695 A 3/1994 Olshefsky (Continued)

FOREIGN PATENT DOCUMENTS

EP 0640395 A1 3/1995

(Continued)

OTHER PUBLICATIONS

"PCT Application No. PCT/SE2006/050145, International Search Report mailed Oct. 2, 2006", 3 pgs.

(Continued)

*Primary Examiner*—Reena Aurora
(74) *Attorney, Agent, or Firm*—Schwegman, Lundberg & Woessner, P.A.

(57) ABSTRACT

The invention relates to a sensor (6) for measuring the distance between a stator and a rotor, which sensor is of the magnetic type and has a sensor body (8) to which is attached a sensor tip (10), The tip of the sensor (10) is connected to the sensor body (8) by a fixing arrangement (14) that has a locking device (16) that interacts with engaging devices (24) and a spring arrangement (34). The locking device (16) is pressed towards an attaching position (A) by the action of a spring force F1 exerted by means of the spring arrangement (34) against the engaging device (24), fixing the sensor body (8) and the tip of the sensor (10) in relation to each other. By the application of a force F2 on the sensor body (8) that is greater than the spring force F1, it is possible to move the sensor body and the tip of the sensor to a releasing position (D), releasing them in relation to each other.

14 Claims, 3 Drawing Sheets

U.S. PATENT DOCUMENTS 6,657,427 B2    12/2003   Aakerblom
2004/0169506 A1  9/2004   Akerblom et al.

FOREIGN PATENT DOCUMENTS

| GB | 2335748 A | 9/1999 |
|----|-----------|--------|
| SE | 520322 C2 | 6/2003 |
| WO | WO-2004/085070 A1 | 10/2004 |
| WO | WO-2006/135331 A1 | 12/2006 |

OTHER PUBLICATIONS

"PCT Application No. PCT/SE2006/050145, Written Opinion mailed Oct. 2, 2006", 4 pgs.

"European Application Serial No. 06733514.1, Communication dated Dec. 30, 2009", 3 pgs.

METHOD AND ARRANGEMENT FOR MOUNTING A SENSOR DESIGNED FOR MEASURING THE DISTANCE BETWEEN STATOR AND ROTOR

RELATED APPLICATIONS

This application is a nationalization under 35 U.S.C. 371 of PCT/SE2006/050145, filed May 22, 2006 and published as WO 2006/135331 A1 on Dec. 21, 2006; which claimed priority under 35 U.S.C. 119 to Sweden Patent Application Serial No. 0501346-1, filed Jun. 14, 2005, which applications and publication are incorporated herein by reference and made a part hereof.

TECHNICAL FIELD

The present invention relates to a method for mounting a sensor and an arrangement for mounting a sensor.

BACKGROUND ART

Refiners designed for the production of paper pulp are generally provided with a sensor arrangement of the magnetic type, that is positioned so that it is stationary in the stator with the end surface of the measuring head on a level with the surface of the grinding segment, for measuring the size of the grinding gap between the stator and the rotor.

A disadvantage of locating the sensor in the surface of the grinding segment is that the sensor is subjected to continual wear during operation. The tip of the sensor with the measuring head is worn down at the same rate as the grinding segment in the machine and the sensor must therefore be replaced when the wear has become so great that the quality of the produced pulp has deteriorated. A normal interval of time between replacements can, for example, be 16 weeks.

A conventional sensor arrangement comprises a sensor mounted in such way that it can be moved in an axial direction, for example by means of a roller screw, in a housing mounted permanently in the stator, for adjusting the arrangement during the calibration process or other functions, which sensor generally has a sensor body upon which a sensor tip is mounted, for example by welding, (at the end of which sensor tip the measuring head is located). The sensor body is normally attached in its housing by means of a screw connection that can be difficult to access and complicated to use and to lock. In order to replace a sensor, time-consuming dismantling of the sensor from the housing is therefore required, with the whole of the sensor including the sensor body and the tip of the sensor having to be replaced, which is labour-intensive and time-consuming.

A sensor of this type comprises a so-called AGS-sensor (adjustable gap sensor), that has been described previously in the Swedish patent document 520 322 from the same applicant and will therefore not be described in greater detail here.

OBJECT OF INVENTION

The object of the invention is therefore to make it possible to produce a sensor, the tip of which sensor can be mounted in a way that is reliable but simpler than was previously the case.

DISCLOSURE OF INVENTION

The object of the invention is achieved by means of a method and by an arrangement for arranging a sensor.

Advantageous further developments of and improvements to the invention are apparent from the subordinate claims and from the description.

BRIEF DESCRIPTION OF DRAWINGS

The embodiments of the invention are described in greater detail in the following with reference to the attached drawings.

MODES FOR CARRYING OUT THE INVENTION

Figure 1:
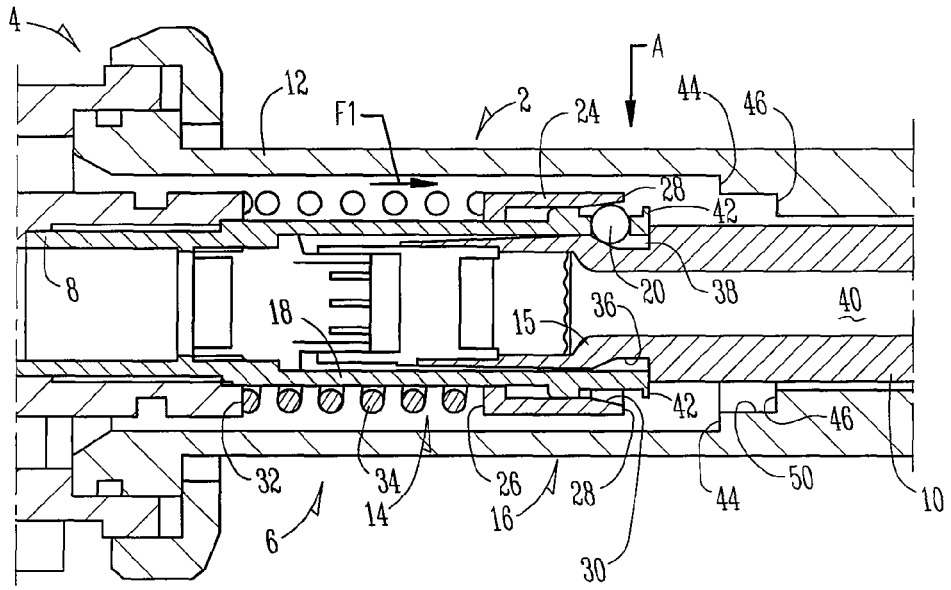
FIG. 1 shows a cross section of a sensor with a sensor body and a sensor tip attached inside this in the attaching position (A), for measuring the distance between the stator and the rotor in a machine.
Figure 2:
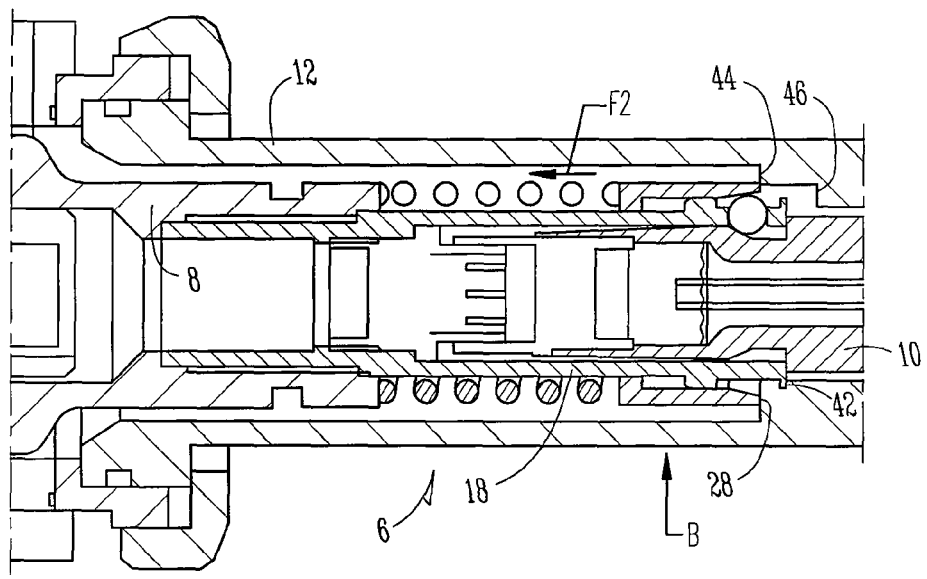
FIG. 2 shows the sensor according to FIG. 1 after moving this forward to the engaging position (B), for commencing the disengagement of the tip of the sensor.
Figure 3:
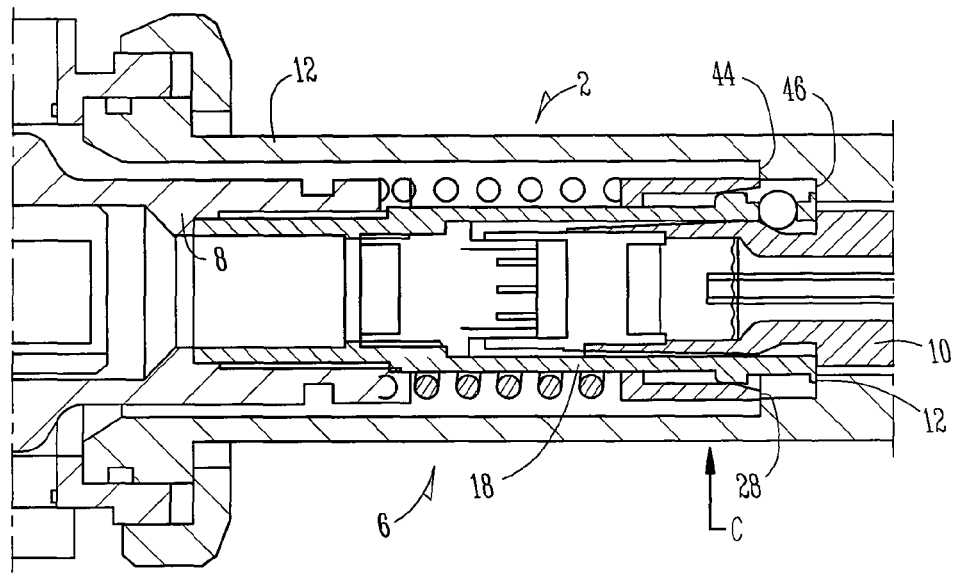
FIG. 3 shows the sensor according to FIG. 1 after moving this further forward to the locking position (C), in which position the tip of the sensor can be removed from the sensor body.
Figure 4:
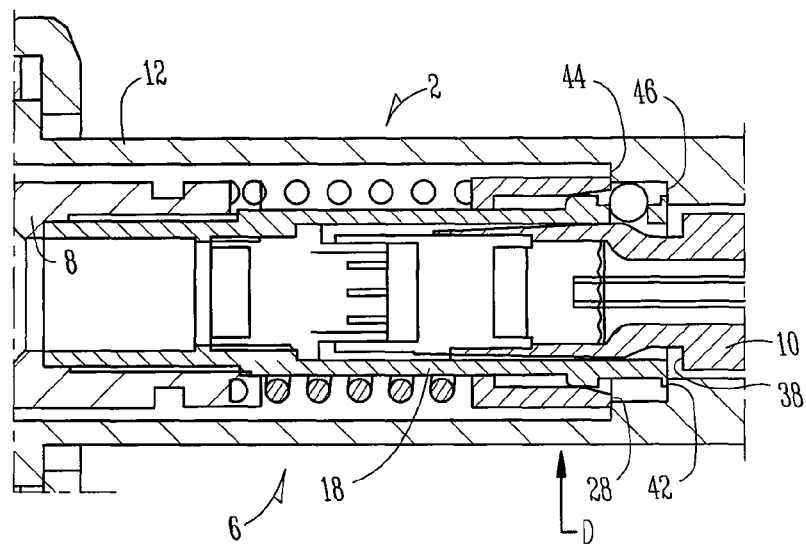
FIG. 4 shows the sensor according to FIG. 1 in the releasing position (D), when the tip of the sensor has been taken a short distance out of the sensor body.
Figure 5:
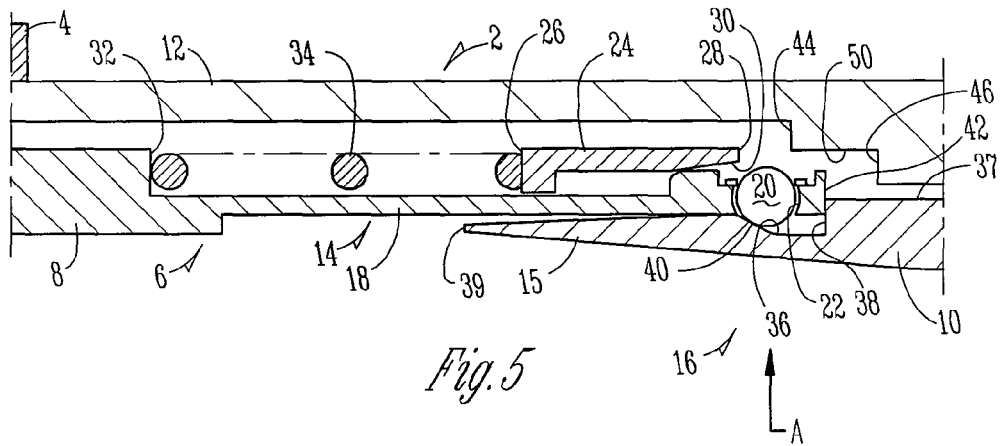
FIG. 5 shows a cross section through the sensor according to FIG. 1 in the attaching position (A), with the parts comprised in the locking device shown in greater detail.
Figure 6:
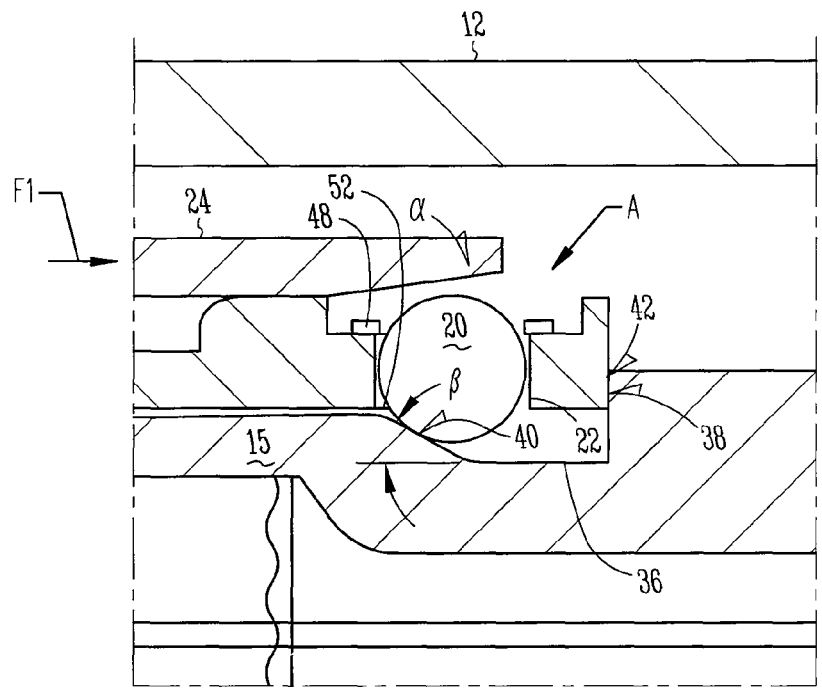
FIG. 6 shows the sensor with the parts that are vital for the attaching function in the attaching position (A) according to FIG. 5 shown in larger scale.

A sensor arrangement 2 of the type described in the introduction comprises a housing 4, that is permanently attached in a stator (not shown), which housing can, for example, be screwed into the stator. The sensor arrangement 2 is provided in the conventional way with a sensor 6, that is mounted, for example by means of a roller screw (not shown) in such a way that it can be moved in an axial direction, which sensor has generally a sensor body 8 in which a sensor rod or sensor tip 10 is mounted, for example by means of welding, and at the end of which the measuring head (not shown) is located.

The sensor body 8 is normally attached in its housing 4 by means of a screw connection (not shown). The roller screw (not shown) can be operated, for example, by means of an operating device (also not shown) of a known type (manual, electrical stepping motor, etc).

According to the invention, an improved arrangement of a sensor 6 is proposed, with a stationary holder 12, that can be designed as a tube 12 that can be mounted in the housing 4, suitably by being screwed in. The sensor 6, with the sensor body 8 and sensor tip 10 that can be mounted on the sensor body, is thereby arranged in the stationary holder 12 in such a way that it can be moved. The sensor body 8 is provided with a fixing arrangement 14 designed as a female part, for mounting a connecting part 15 of the sensor rod or the sensor tip 10, designed as a complementary male part, that can be connected to this.

The fixing arrangement 14 designed as a female part comprises a locking device 16 for locking the connecting part 15 in the fixing arrangement. For this purpose, the locking device 16 of the fixing arrangement 14 comprises a locking sleeve 18 that is open at its free end. In addition, the locking device comprises a predetermined number of locking means 20, that are arranged adjacent to the free end of the locking sleeve 18 and that are evenly distributed around the circumference of the sleeve. Each locking means 20 is arranged to be able to move freely in its hole 22 in the radial direction of the locking sleeve. At least three locking means with associated holes are suitably evenly distributed around the circumference of the locking sleeve. The locking device 16 is arranged to interact with an engaging device arranged on the locking sleeve 18 that can be moved, for example in the form of an engaging sleeve 24 that has a sprung shoulder 26 arranged at one end. At the other free end 28 that is open and faces in the same direction as on the locking sleeve 18, the engaging sleeve 24 is provided with an internal lead-in 30 at an acute angle α of 5-15 degrees. By this means, the engaging sleeve 24 is arranged to be able to be moved on the locking sleeve 18, whereby the open free end 28, that is gently conically tapering over the lead-in 30 on the inside of the engaging sleeve, is able to be moved into engagement with the locking means 20 in the locking sleeve 18.

A spring seating 32 is arranged on the sensor body 8 in such a way that it is opposite the sprung shoulder 26 of the engaging sleeve. Between the seating 32 and the shoulder 26 there is a spring arrangement 34 arranged to act with a spring force F1.

The connecting part 15 of the sensor tip 10, that is designed as a male part, has a recess 36 in the external circumference surface 37, which recess is arranged, in its mounted state with the connecting part 15 in the fixing arrangement 14, to coincide with the respective hole 22 in the locking sleeve 18.

The recess 36 is delimited by a contact surface 38 that is arranged essentially at right angles to the circumference surface 37 of the connecting part 15 of the sensor tip 10, at the furthermost edge of the recess in relation to the free end 39 of the connecting part. On the edge located closest to the free end 39 of the connecting part 15, the recess 36 is delimited by a closed plane constructed as a wedge surface 40 at an oblique angle β in relation to the circumference surface 37 of the sensor tip 10. The angle β is larger than the angle α and can assume values in a range of 20-40 degrees.

By means of the force F1 exerted by the spring arrangement 34 against the engaging sleeve 24, the locking device 16 is pressed towards an attaching position (A), fixing the sensor body 8 and the tip of the sensor 10 in relation to each other, in which a stop face 42 located at the free end of the locking sleeve 18 is in contact with the contact surface 38 on the connecting part 15 of the sensor tip. In the attaching position (A), the locking device 16 is also engaged by the engaging sleeve 24. More specifically, by the action of the engaging sleeve 24, each locking means 20 is locked in the respective hole 22 by the locking sleeve 18 and is wedged fast between the lead-in 30 on the engaging sleeve 24 and the wedge surface 40 of the connecting part 15. Provided that the spring force F1 is larger than an opposing force that is generated in the engaging sleeve 24 by the wedge action against the lead-in 30, the connecting part 15 of the sensor tip 10 will remain attached securely to the sensor body 8. As the acute angle α of the lead-in 30 on the engaging sleeve 24 is only between 5 and 15 degrees, a very large force is required to forcibly pull the connecting part 15 out of the locking sleeve 18.

Upon the application of a force F2 on the sensor body 8 that is greater than the force F1 exerted by the spring arrangement, the sensor 6 is moved from the attaching position (A) via an engaging position (B) and a subsequent locking position (C) to a releasing position (D) in which the sensor body 8 and the tip of the sensor 10 are released in relation to each other. In the releasing position (D), the tip of the sensor has been moved a short distance out of the sensor body.

The force F2 is achieved, for example, by moving the sensor forward by means of the roller screw in such a way that the sensor 6 assumes the engaging position (B), in which the open free end 28 of the engaging sleeve 24 comes into contact with a first shoulder 44 in the stationary holder 12. After that, the sensor 6 is moved forward an additional amount to the locking position (C), in which the stop face 42 of the locking sleeve 18 has come into contact with a second shoulder 46 in the stationary holder 12. In this locking position (C), the engaging sleeve 24 has been moved, via the free end 28 that is in contact with the first shoulder 44 in the holder 12, against the force F1 of the spring arrangement, by means of the force F2 from the roller screw, such a distance that the locking means 20 are no longer locked in their respective holes 22 in the locking sleeve 18 by the engaging sleeve 24. The locking means are thereby free to move radially outwards in the holes in such a way that the tip of the sensor 10 can be pulled out of the sensor body 8. The locking means can, for example, consist of balls 20, that can move radially in the holes against a relatively small force F3 from a spring ring 48 of conventional type. The three abovementioned forces are in the following ratios: F2>F1>F3.

In the releasing position (D), in which the open free end 28 of the engaging sleeve 24 is in contact with the first shoulder 44 and the stop face 42 of the locking sleeve 18 is in contact with the second shoulder 46 in the stationary holder 12, the tip of the sensor 10 has thus been pulled a little way out of the sensor 8, where applicable by means of a tool. By the action of the wedge surface 40, the balls 20 have then been moved radially outward in the holes 22 such a distance that the tip of the sensor 10 is released, so that it can be pulled out of the sensor body 8. The balls 20 are then retained, adjacent to their radially outermost position in their respective holes by means of an internal surface 50 extending between the first shoulder 44 and the second shoulder 46 in the holder 12 and arranged concentrically in the same. As soon as the tip of the sensor 10 has been pulled out of the sensor body 8, for example when being removed for replacement or inspection, the balls 20 return, by the action of the force F3 from the spring ring 48, to their radially innermost position in their respective holes 22, which position is defined in a known way by means of a ring flange 52, that has a smaller diameter than the diameter of the balls.

For connecting the measuring head with the sensor's measuring and computer system, requisite connection leads can be connected in the conventional way, for example by means of electrical connectors (male/female) of the conventional type (not shown) arranged in the locking sleeve 18 and in the connecting part 15. Thus, it is thereby possible when mounting and removing the tip of the sensor, for example in order to replace it, to make an electrical connection between the parts at the same time as making the mechanical connection, and inspection and calibration of the sensor can also be carried out in association with the replacement.

The invention claimed is:

1. Method for arranging a sensor in a holder in a machine provided with a stator and an opposing rotor, which sensor is arranged in the stator for measuring a distance between the stator and the rotor, which sensor is of the magnetic type and has a sensor body in which a sensor tip can be mounted, the method comprising:

inserting a connecting part on the tip of the sensor in a fixing arrangement on the sensor body using a locking device that is arranged on the fixing arrangement and that interacts with engaging devices and a spring arrangement, and pressing the locking device towards an attaching position by the action of a spring force exerted by the spring arrangement against the engaging devices to fix the fixing arrangement and the connecting part in relation to each other.

2. Method according to claim 1, comprising:
for removing the tip of the sensor from the sensor body, exerting a force that is greater than the spring force on the sensor body,
using the force, moving the engaging devices to an engaging position in contact with a first shoulder in the holder,
moving the locking device to a locking position in contact with a second shoulder in the holder,
during the movement of the locking device to the locking position, moving the engaging sleeve such a distance against the spring force that the locking device is no longer engaged by the engaging sleeve, and
when the connecting part is withdrawn from the fixing arrangement, to assume a releasing position, releasing the sensor body and the tip of the sensor in relation to each other.

3. Method according to claim 1, wherein the locking device comprises locking means, that, when the locking device is no longer engaged by the engaging sleeve, are moved, by wedge action exerted by a wedge surface on a recess in the connecting part, out of the recess for withdrawal of the connecting part from the fixing arrangement.

4. Arrangement for arranging a sensor, in a machine provided with a stator and an opposing rotor, comprising a sensor arranged in the stator for measuring a distance between the stator and the rotor, which sensor is of the magnetic type and has a sensor body to which a sensor tip is connected, wherein the tip of the sensor has a connecting part that can be inserted in a fixing arrangement in the sensor body by means of a locking device arranged on the fixing arrangement, with engaging devices and a spring arrangement that interact, and in that the locking device is pressed towards an attaching position by the action of a spring force exerted by means of the spring arrangement against the engaging devices, fixing the fixing arrangement and the connecting part in relation to each other.

5. Arrangement according to claim 4, wherein the tip of the sensor can be removed from the sensor body, by the application of a force that is greater than the spring force on the sensor body.

6. Arrangement according to claim 5, wherein the engaging devices can be moved by the force to an engaging position in contact with a first shoulder in the holder.

7. Arrangement according to claim 6, wherein the locking device can be moved by the force to a locking position in contact with a second shoulder in the holder.

8. Arrangement according to claim 7, wherein, when the locking device has been moved to the locking position, the engaging sleeve can be moved such a distance against the spring force that the locking device is no longer engaged by the engaging sleeve.

9. Arrangement according to claim 6, wherein, when the locking device has been moved to the locking position, the engaging sleeve can be moved such a distance against the spring force that the locking device is no longer engaged by the engaging sleeve.

10. Arrangement according to claim 7, wherein, when the locking device has been moved to the locking position, the engaging sleeve can be moved such a distance against the spring force that the locking device is no longer engaged by the engaging sleeve.

11. Arrangement according to claim 5, wherein the locking device can be moved by the force to a locking position in contact with a second shoulder in the holder.

12. Arrangement according to claim 5, wherein, when the locking device has been moved to the locking position, the engaging sleeve can be moved such a distance against the spring force that the locking device is no longer engaged by the engaging sleeve.

13. Arrangement according to claim 12, wherein, for withdrawing the connecting part out of the fixing arrangement, the locking device has assumed a releasing position, releasing the sensor body and the tip of the sensor in relation to each other.

14. Arrangement according to claim 13, wherein the locking device comprises locking means, that, when the locking device is not engaged by the engaging sleeve, can be moved out of a recess by wedge action exerted by a wedge surface on the recess in the connecting part, whereby the connecting part can be withdrawn from the fixing arrangement.

* * * * *